US007159112B1

(12) United States Patent
Williams

(10) Patent No.: US 7,159,112 B1
(45) Date of Patent: Jan. 2, 2007

(54) DECRYPTION OF GRAPHICS DATA IN A GRAPHICS PROCESSING PIPELINE

(75) Inventor: Ian M. Williams, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 657 days.

(21) Appl. No.: 10/649,170

(22) Filed: Aug. 26, 2003

(51) Int. Cl.
*G06F 1/24* (2006.01)

(52) U.S. Cl. ........................................ 713/168; 380/54

(58) Field of Classification Search ................ 713/168; 380/54

See application file for complete search history.

(56) References Cited

U.S. PATENT DOCUMENTS 3,814,904 A * 6/1974 Russell et al. .............. 250/369
4,498,736 A * 2/1985 Griffin ......................... 380/54
5,428,479 A * 6/1995 Lee ............................ 359/567

* cited by examiner

*Primary Examiner*—Thomas R. Peeso
(74) *Attorney, Agent, or Firm*—Townsend and Townsend and Crew LLP

(57) ABSTRACT

Encrypted graphics data is transmitted between systems or components of a system. The data is decrypted within a graphics processor or other recipient device that has been provided with an appropriate key. In one embodiment, encryption is performed by perturbing selected parameters of the graphics data so that the encrypted data can be used to generate a distorted image, and decryption is performed by reversing the perturbation.

38 Claims, 6 Drawing Sheets

DECRYPTION OF GRAPHICS DATA IN A GRAPHICS PROCESSING PIPELINE

CROSS-REFERENCES TO RELATED APPLICATIONS

The present disclosure is related to commonly-assigned co-pending U.S. patent application Ser. No. 10/649,306, filed on the same date as the present application, entitled "Encryption or Perturbation of Graphics data in a Graphics Processing Pipeline," which disclosure is incorporated herein by reference for all purposes.

BACKGROUND OF THE INVENTION

The present invention relates to cryptographic systems and in particular to systems and methods for encrypting and/or perturbing graphics data in a graphics processing pipeline.

Computer-based image generating systems for generating and manipulating graphics data are known in the art. Graphics data typically provides a two-dimensional or three-dimensional geometric model of one or more objects (e.g., an airplane, a car, a building); the model generally includes coordinates, colors, and other properties of a group of related "primitives," which are typically triangles or other simple polygons. To display the object on a conventional pixel-based display device, the geometry data is transformed to a viewing coordinate system corresponding to the display area, then scan-converted to color values for each pixel of the display based on which primitives are visible in each pixel region. Other operations (e.g., lighting transformations and texture mapping) may also be included in the rendering sequence, before and/or after the viewing transformation and scan conversion.

In general, geometry data provides more information about the objects being rendered than does pixel data. For instance, the geometry data may provide a complete three-dimensional model of an object at a high level of detail, while the pixel data provides only color values corresponding to portions of the object that are visible in a particular view.

In many instances, generation of geometry data and subsequent processing are performed by separate components or devices. For instance, geometry data is often generated by application programs running on a central processor of a computing system (e.g., a desktop computer), while rendering is performed by a dedicated graphics processing subsystem. Alternatively, geometry data may be generated by an application program and transferred over a network to another device that generates displayable pixel data.

In conventional systems, such transfers of geometry data are generally not secure. Network traffic can be monitored and data intercepted. Even within a single computer system (such as a typical desktop computer with a graphics card), traffic on the system bus between the central processor and the graphics card can be intercepted using various well-known tracing tools. Thus, unauthorized users can obtain geometry data, not just the displayable pixel data, thereby gaining information that the creator of the data may not want to share.

As geometry data and modeling techniques become more sophisticated, this lack of security becomes an increasing concern. For example, computer-aided design (CAD) systems can be used to generate very exact geometry models of valuable products (e.g., an aileron for an airplane). An unauthorized party who obtains such a model may be able to obtain trade secrets or other confidential information by analyzing the geometry data. Such risks make creators of high-precision geometry data reluctant to share it.

In addition, the risk of providing too much information makes it difficult for creators to share geometry data with parties who need at least partial information. For instance, a manufacturer soliciting bids from a supplier for a particular part needs to give the supplier enough information about the part to enable the supplier to estimate the cost of making it, but the manufacturer generally does not want to provide exact specifications until a contract with a non-disclosure provision has been signed. CAD-generated geometry data that conforms precisely to the specifications is unsuitable for this purpose. Instead, a new, lower-precision model must be created, often at considerable effort and/or expense. There may be other potential applications of the CAD-generated data as well, such as documentation, technical support for field engineers, etc., each having its own conflicting requirements in terms of which details should or should not be made available. Thus, a product may be modeled several different times, with each new model incurring additional overhead. Further, if the product design changes, some or all of the models may have to be regenerated. This is clearly inefficient.

Therefore, systems and methods for controlling the sharing of geometry data would be desirable.

BRIEF SUMMARY OF THE INVENTION

Embodiments of the present invention provide security for graphics data by supporting the transmission of encrypted data between systems or between components of a system. The data is decrypted within a graphics processor or other recipient device that has been provided with an appropriate key. In some embodiments, encryption is performed by perturbing selected parameters of the data; if the key is not provided, the data may be displayable but the resulting image will be distorted to some degree. Depending on the degree of distortion, details may be obscured or the image may be entirely unrecognizable. In other embodiments, decryption is dependent on the key; some keys may cause the decrypted data to include a residual distortion that obscures selected details of the image.

According to one aspect of the invention, a device for processing an image includes a decryption module, a key module, and an image generation module. The decryption module is configured to receive geometry data, wherein at least a portion of the received geometry data is encrypted, and to decrypt the geometry data based at least in part on a decryption parameter. The key module is configured to receive key data and to provide the decryption parameter to the decryption module in response to the key data. The image generation module is coupled to receive the decrypted geometry data from the decryption module and configured to transform the decrypted geometry data to displayable image data. In one embodiment, the encrypted portion of the geometry data includes vertex coordinates of a primitive that are encrypted by applying a perturbation; the decryption module removes the perturbation.

In some embodiments, the key data is provided by a key device that connects to a receptacle of the key module. In other embodiments, the key data is provided by the sender of the geometry data. In addition, different key data may have different effects. In one embodiment, the key module is configured to receive either of first key data and second key data and further configured to provide a first decryption parameter in response to the first key data and a second decryption parameter in response to the second key data. In response to the first decryption parameter, the decryption module completely decrypts the geometry data and, in response to the second decryption parameter, the decryption module decrypts the geometry data with a residual distortion.

According to another aspect of the invention, a system for generating images includes a sender device and a recipient device. The sender device is configured to send geometry data via a communication channel, wherein at least a portion of the geometry data is encrypted. The recipient device includes a decryption module, a key module, and an image generation module. The decryption module is configured to receive the encrypted geometry data and to decrypt the geometry data based at least in part on a decryption parameter. The key module is configured to receive key data and to provide the decryption parameter to the decryption module in response to the key. The image generation module is coupled to receive the decrypted geometry data from the decryption module and configured to convert the geometry data to displayable image data.

According to yet another aspect of the invention, a method of generating an image is provided. Geometry data for the image is received. At least a portion of the received geometry data is encrypted. It is determined whether a key is present. In response to determining that the key is present, the encrypted portion of the geometry data is decrypted, and an image is rendered using the decrypted geometry data. In some embodiments, when the key is present, a decryption parameter is extracted from the key, and decryption is responsive to the decryption parameter. In some embodiments, when the key is not present, an image may be rendered using the received geometry data including the encrypted portion.

The following detailed description together with the accompanying drawings will provide a better understanding of the nature and advantages of the present invention.

DETAILED DESCRIPTION OF THE INVENTION

Embodiments of the present invention provide security for graphics data by encrypting the data prior to transmission between systems or between components of a system. The data is decrypted within a graphics processor or other recipient device that has been provided with an appropriate key. Encryption may be performed by perturbing selected parameters of the data; if the key is not provided, the data may be displayable but will be distorted to some degree. Depending on the degree of distortion, details may be obscured or the image may be entirely unrecognizable.

I. Computer System Embodiment

Figure 1:
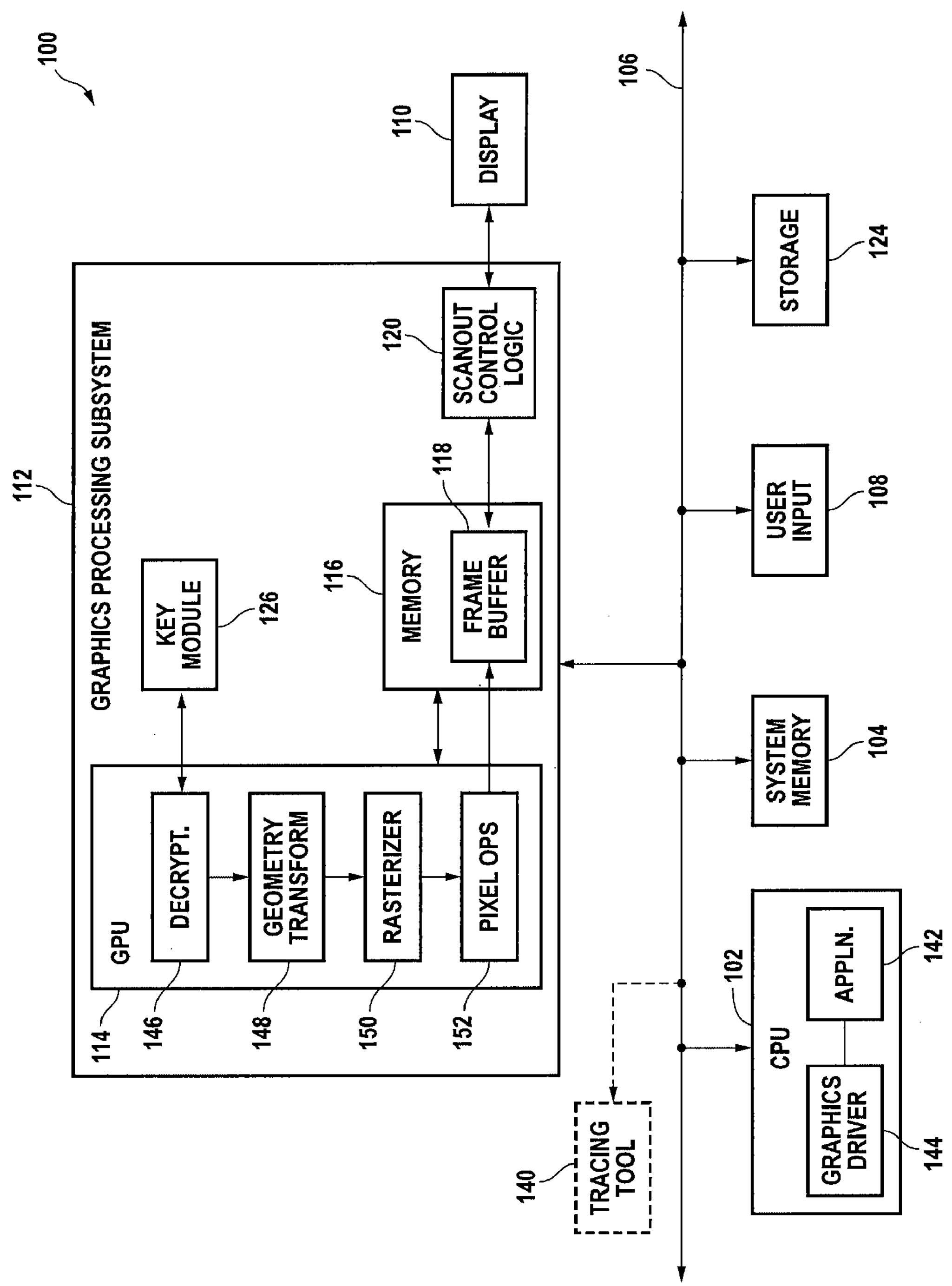
FIG. 1 is a simplified block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel-based display device 110 (e.g., a conventional CRT- or LCD-based monitor) operating under control of a graphics processing subsystem 112 coupled to system bus 106. Other components, such as a storage device 124 (e.g., fixed or removable magnetic disk drive, compact disk (CD) drive, and/or DVD drive), may also be coupled to system bus 106.

Graphics processing subsystem 112 includes a graphics processing unit (GPU) 114, a graphics memory 116, and scanout control logic 120, which may be implemented using conventional semiconductor devices. Graphics processing subsystem 112 also includes a key module 126 that is used to control decryption operations performed by GPU 114. As will be described further below, in one embodiment, key module 126 includes a receptacle for a physical object that controls the decryption operations; in another embodiment, key module 126 includes registers and/or other memory devices that store data that control decryption operations.

Also shown in FIG. 1 (dashed lines) is a tracing tool 140 coupled to bus 106. Tracing tool 140 is configured to intercept graphics data as it is transferred over bus 106 from CPU 102 to GPU 114. Tracing tool 140 provides the intercepted data to a user. Numerous examples of tracing tools are known in the art, such tools may be used for legitimate purposes, e.g., understanding system performance, or illegitimate purposes, e.g., extracting trade secrets from the graphics data. When graphics data is transferred over bus 106 in encrypted form, tracing tool 140 is unable to obtain useful information.

In operation, system 100 generates graphics data and images for display on display device 110. CPU 102 executes an application 142 such as a computer-aided design (CAD) or video game program that generates graphics data from which a displayable image can be rendered. In some embodiments, graphics data includes geometry data such as vertex coordinates, color parameters, and other information describing one or more primitives (e.g., triangles or other polygons) that make up one or more two-dimensional or three-dimensional objects to be displayed. The graphics data may also define relationships among various primitives (e.g., a group of primitives may be identified as making up an object, such as a table, and the relationship of that object to other objects in the image may be specified). Graphics data may also contain other information used for rendering the image, such as a view point and view direction, boundaries of the viewable area or volume, lighting parameters, texture data, and so on. In other embodiments, graphics data may include experimental measurement data, from which a graph or other visual display can be generated. Numerous techniques and formats for generating graphics data are known in the art, and any such techniques and formats may be used.

CPU 102 also executes a graphics driver program 144, which provides an interface between graphics processing subsystem 112 and application program 142. In response to an instruction from application program 142, graphics driver program 144 initiates a transfer of the graphics data to graphics processing subsystem 112 via system bus 106. In one embodiment of the present invention, the graphics data is encrypted by graphics driver program 144 before it is transferred to system bus 106. Specific examples of encryption algorithms will be described below. In some embodiments, only portions of the data are encrypted, and the term "encrypted graphics data" is to be understood as including graphics data only portions of which are encrypted. Where portions of the data are encrypted, the encrypted data may be recognizable as graphics data and may even be usable to render an image, but any image rendered from the encrypted data will not reflect the true graphics data. In another embodiment, program code implementing the encryption algorithm is included in application program 142 rather than in graphics driver program 144.

In some embodiments, e.g., where the encrypted data is recognizable as graphics data, the encrypted data is advantageously marked as being encrypted. For instance, an encryption flag may be included in the data and used to indicate whether the data is encrypted or not. The encryption flag may be implemented as any data structure indicating that the data is encrypted. For instance, the flag may be a single bit with one state corresponding to encrypted data and another state corresponding to cleartext (i.e., not encrypted) data, or the flag may include additional information, such as a code indicating which of a number of alternative encryption techniques has been employed.

The encrypted graphics data is sent to GPU 114 via system bus 106. Even if tracing tool 140 intercepts this data, any valuable information contained therein is protected: the interceptor will be unable to make use of the data without first decrypting it. Unencrypted graphics data is present internally to CPU 102 and GPU 114, where it is more difficult to access.

GPU 114 receives the encrypted graphics data and provides it to a decryption module 146. Decryption module 146 decrypts the graphics data by executing a decryption algorithm that reverses the encryption and restores the original data. The operation of decryption module 146 is dependent on the presence and/or content of key data provided to key module 126.

Figure 2:
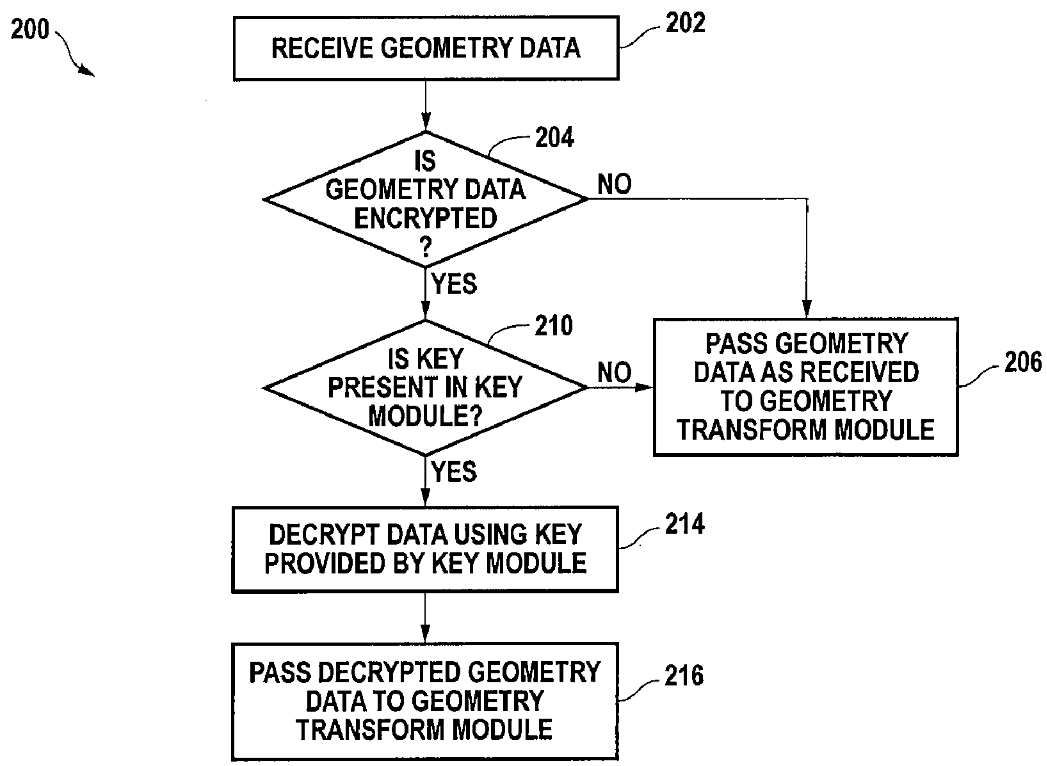
FIG. 2 is a flow chart of a decryption process according to an embodiment of the present invention.

More specifically, FIG. 2 is a flow chart illustrating a process 200 that may be executed by decryption module 146. At step 202, decryption module 146 receives the graphics data. At step 204, it is determined whether the graphics data is encrypted. As noted above, an encryption flag may be provided; accordingly, step 204 may involve checking this flag. Alternatively, there may be other properties of the data indicating whether it is encrypted, and step 204 may include checking these properties.

If the data is not encrypted, then at step 206 decryption module 146 passes along the data as received. If the data is encrypted, then at step 210 decryption module 146 checks key module 126 for the presence or absence of key data. This step may be implemented in various ways, depending on how key module 126 is implemented. Examples of key module implementation will be described below.

If key data is not present, decryption module 146 passes along the data as received (step 206). In general, processing the encrypted data will result in either a displayed image that does not accurately reflect the original graphics data or an error condition, depending on how the data was encrypted.

If key data is present in key module 126, then at step 214 decryption module 146 decrypts the data, which advantageously includes using the key data or parameters derived from the key data. Details of the decryption process depend on the encryption technique that was used to encrypt the data; specific examples will be described below. At step 216, decryption module 146 passes along the decrypted data. In this embodiment, an image rendered from the decrypted data accurately reflects the original graphics data, subject to inherent limitations of the graphics processing hardware and/or display device.

A geometry processing module 148 receives the graphics data (which may be decrypted or not, as described above) from decryption module 146 and performs geometry operations on the received data. These operations may include lighting transforms, coordinate transforms to a viewing space defined by image plane (x, y) and depth (z) coordinates, culling of unseen primitives (e.g., back-facing primitives and/or primitives located entirely outside the viewable region), clipping of unseen portions of primitives, and the like. Any kind of transformation or other manipulation of the graphics data can be implemented; numerous examples are known in the art. In some embodiments, encrypted graphics data is not usable by geometry processing module 148, and where such data is received, geometry processing module 148 may generate an error signal. The error signal can be used to generate an error message on display device 110, or passed via system bus 106 to CPU 102 to execute an error handling program. Numerous techniques for handling errors are known in the art, and any such techniques may be implemented.

If no error occurs, geometry processing module 148 provides the transformed graphics data to a rasterizer 150. Rasterizer 150 converts the data to one or more shading sample values per pixel, for displaying on a pixel-based display device (e.g., conventional CRT- or LCD-based monitors). Rasterizer 150 may implement conventional scan-conversion and depth-buffering techniques, as well as other processes.

Rasterizer 150 provides the rasterized data to a pixel operation module 152, which performs additional operations on the pixel data. In some embodiments, these operations include texture mapping and blending of multiple shading sample values for a pixel to produce a single shading value per pixel that can be displayed on a display device. Again, numerous examples of operations that may be implemented in pixel operation module 152 are known in the art. Pixel data is written to frame buffer 118 of graphics memory 116.

Pixel data in frame buffer 118 is scanned out by scanout control logic 120 and displayed on display device 110. In one embodiment, scanout occurs at a constant frame rate (e.g., 80 Hz); the frame rate can be a user-selectable parameter. Scanout control logic 120 may also perform other operations such as adjustment of color values, generating composite screen images by combining the pixel data in frame buffer 118 with data for a video or cursor overlay image or the like obtained from another data source (not shown), digital-to-analog conversion, and so on.

It will be appreciated that system 100 is illustrative and that variations and modifications are possible. The display device can be any pixel-based display, e.g., a CRT or LCD monitor, laser projection system, printer, etc. GPU 114 or any of its components can be implemented using one or more programmable processors programmed with appropriate software, application-specific integrated circuits (ASICs), other integrated circuit technologies, or any combination of these. In some embodiments, key module 126 is also wholly or partially integrated into GPU 114. Graphics memory 116 may be implemented using one or more memory devices and may include additional memory interface circuitry. Scanout control logic 120 may be implemented in the same device (e.g., programmable processor) as GPU 114 or a different device. In view of the present disclosure, persons of ordinary skill in the art will recognize that the present invention can be embodied in a wide variety of system configurations.

II. Encryption and Decryption of Graphics data

Examples of cryptographic (encryption and decryption) techniques according to embodiments of the present invention will now be described. In general, the goal of cryptography is to hide data (also referred to as a "message") from entities other than the intended recipient. Thus, cryptography typically involves an encryption algorithm used by a sender to convert the original message (referred to herein as "cleartext," a term of art that does not imply any particular format for the data) into an encrypted form in which the message is concealed and a decryption algorithm used by a recipient to convert encrypted data back to its original form. Properly decrypted data matches the cleartext data, while improperly decrypted data does not.

As used herein, "sender" and "recipient" are generic terms. The term "sender" includes any device or component that executes an encryption algorithm on cleartext data, and the term "recipient" includes any device or component that executes a decryption algorithm on encrypted data sent by the sender. For instance, in system 100 of FIG. 1, CPU 102 is a sender and the GPU 114 is a recipient. It is to be understood that the "sender" and "recipient" are not restricted to any particular hardware devices or components.

To prevent unauthorized recipients from decrypting the message, cryptographic techniques generally rely on a "shared secret" (also referred to as a key), i.e., a piece of data known to both the sender and the intended recipient but not known to others, knowledge of which is necessary to correctly perform the decryption algorithm. In some instances, the shared secret is the algorithm itself, but more often, the shared secret is data other than the encrypted message (e.g., a parameter value) that is needed to correctly execute the decryption algorithm.

A. Selective Encryption of Graphics data

In embodiments of the present invention, cryptography is used in a context where the "message" is graphics data and the goal is to prevent unauthorized recipients from obtaining an accurate geometric model. This goal can be achieved by encrypting selected portions of the graphics data, leaving other portions as cleartext. The resulting encrypted message may be recognizable to an unauthorized recipient as graphics data and may in some instances be usable to render an image, but the rendered image does not correspond to what the recipient would have rendered had it been given the cleartext. Thus, selective encryption of portions of the data can be used to hide information, providing the desired degree of security at a fraction of the computational burden associated with encrypting and decrypting all of the data.

In one embodiment, the sender encrypts the vertex coordinates of each primitive according to some encryption algorithm, leaving other parameters as cleartext. A recipient with knowledge of the shared secret reverses the encryption, thereby obtaining the true vertex coordinates, and displays the image correctly. A recipient without such knowledge cannot reverse the encryption. If such a recipient uses the encrypted vertex coordinates to render an image, the resulting image may be incorrect (e.g., distorted or completely unrecognizable) or the recipient may not be able to render an image at all.

As used herein, the terms "correct" and "incorrect" refer only to whether an image does or does not correspond to what would have been rendered by a given device under identical operating conditions from the cleartext graphics data and do not preclude differences in actual rendered images. Those of skill in the art will appreciate that the appearance of an image may be affected by a number of factors other than the graphics data, such as the capabilities of a particular rendering device, quality of a particular display device, and various user-adjustable settings of the rendering and/or display devices.

In other embodiments, parameters other than vertex coordinates may be encrypted, either instead of or in addition to the vertex coordinates. For example, some graphics processors have programmable shaders, and graphics data provided to such processors may include instructions to be executed by the shader and/or parameters for controlling various shading programs resident in the graphics processor. These portions of the graphics data may also be encrypted, so that images will be shaded incorrectly, thereby obscuring valuable information. Similarly, any two-dimensional or three-dimensional texture maps provided to the graphics processor may be encrypted so that the true content of the texture maps is not available to an unauthorized recipient. More generally, any vertex parameter or other component of the graphics data may be encrypted.

To reduce the computational burden of encryption and decryption, it is advantageous to encrypt only those parameters or other portions of the data whose secrecy is important in a particular context. For example, if the graphics data corresponds to a part for which the exact shape is critical (e.g., an airplane rudder or aileron), encrypting only vertex coordinates may be sufficient to prevent interceptors of the data from deriving any valuable information from it.

B. Cryptographic Algorithms

Various techniques for encrypting the selected portions of the graphics data may be employed. Examples will be described for embodiments in which the vertex coordinates of the graphics data are encrypted; it is to be understood that similar techniques may be used to encrypt other parameters or portions of the data.

In some embodiments, encryption of vertex data may be done according to conventional computer-implemented encryption algorithms, which may be implemented using secret-key (symmetric) or public-key (asymmetric) cryptographic techniques. In general, these encryption algorithms involve the use of various mathematical functions. Inputs to the functions include a block of message data (e.g., 64 bits) and a key, and the functions are designed such that the output has no readily detectable correlation with the inputs. The key is typically a large number (in some algorithms, it may have 128 or more bits). Encryption algorithms are reversible; i.e., a recipient with an appropriate key can extract the message from the encrypted data.

In secret-key cryptography, the same key is used for both encryption and decryption. In that sense, the encryption is symmetric. Numerous secret-key algorithms are known in the art, including Data Encryption Standard (DES), Advanced Encryption Standard (AES, also called Rijndael), and the One-Time Pad (OTP). In such systems, a secure mechanism for sharing the key between the sender and recipient is important, since a third party who intercepts the key may be able to guess the algorithm and decrypt the data. Examples of mechanisms for securely sharing keys according to the present invention will be described below.

In public-key cryptography, two keys (generally called a “public key” and a “private key”) are provided. The keys are related such that data encrypted with one key can be decrypted only with the other; in that sense, the encryption is asymmetric. The recipient provides the public key to the sender and keeps the private key secret. The most widely used example is RSA (the Rivest-Shamir-Adleman algorithm), but other public-key algorithms are also known and may be used. Unlike secret-key cryptography, public key cryptography does not require secure mechanisms for sharing the public key because the public key cannot be used to decrypt the sender's message. Asymmetric algorithms, however, are generally slower than symmetric algorithms.

Figure 3A:
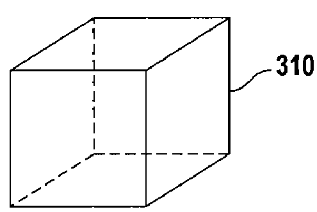
FIG. 3 illustrates images generated according to an embodiment of the present invention, with FIG. 3A illustrating an image generated from cleartext and FIGS. 3B and 3C illustrating images generated with small and large perturbations, respectively.
Figure 3B:
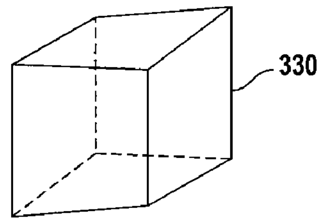
Figure 3C:
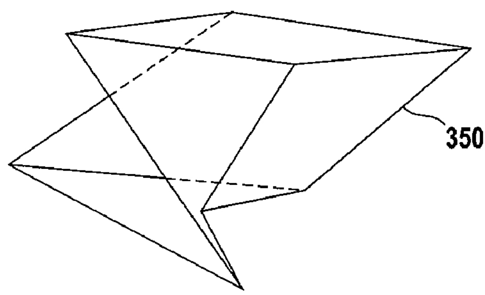

In other embodiments, vertex coordinates are encrypted by applying a perturbation that changes the location of individual vertices in three-dimensional space. The size of the perturbation is determined in accordance with various perturbation parameters. A primitive with perturbed vertex coordinates can be rendered by a graphics processing system, but the resulting image is incorrect. FIGS. 3A–C illustrate the effect of perturbing vertex coordinates. Image 310 (FIG. 3A), rendered from cleartext data, is a cube. Images 330 (FIG. 3B) and 350 (FIG. 3C) are rendered from the data used to render image 310, but in each instance, the vertex coordinates have been perturbed while other parameters of the data have not been affected. The perturbation results in distortion. In image 330, the distortion is relatively small, so that the image appears to be a cube, but details are obscured. For instance, it would be difficult to determine the exact lengths of the edges. In image 350, the distortion is large, and the image does not resemble a cube. Because the perturbation hides the correct geometric model from unauthorized recipients, perturbation acts as a form of encryption.

Figure 4:
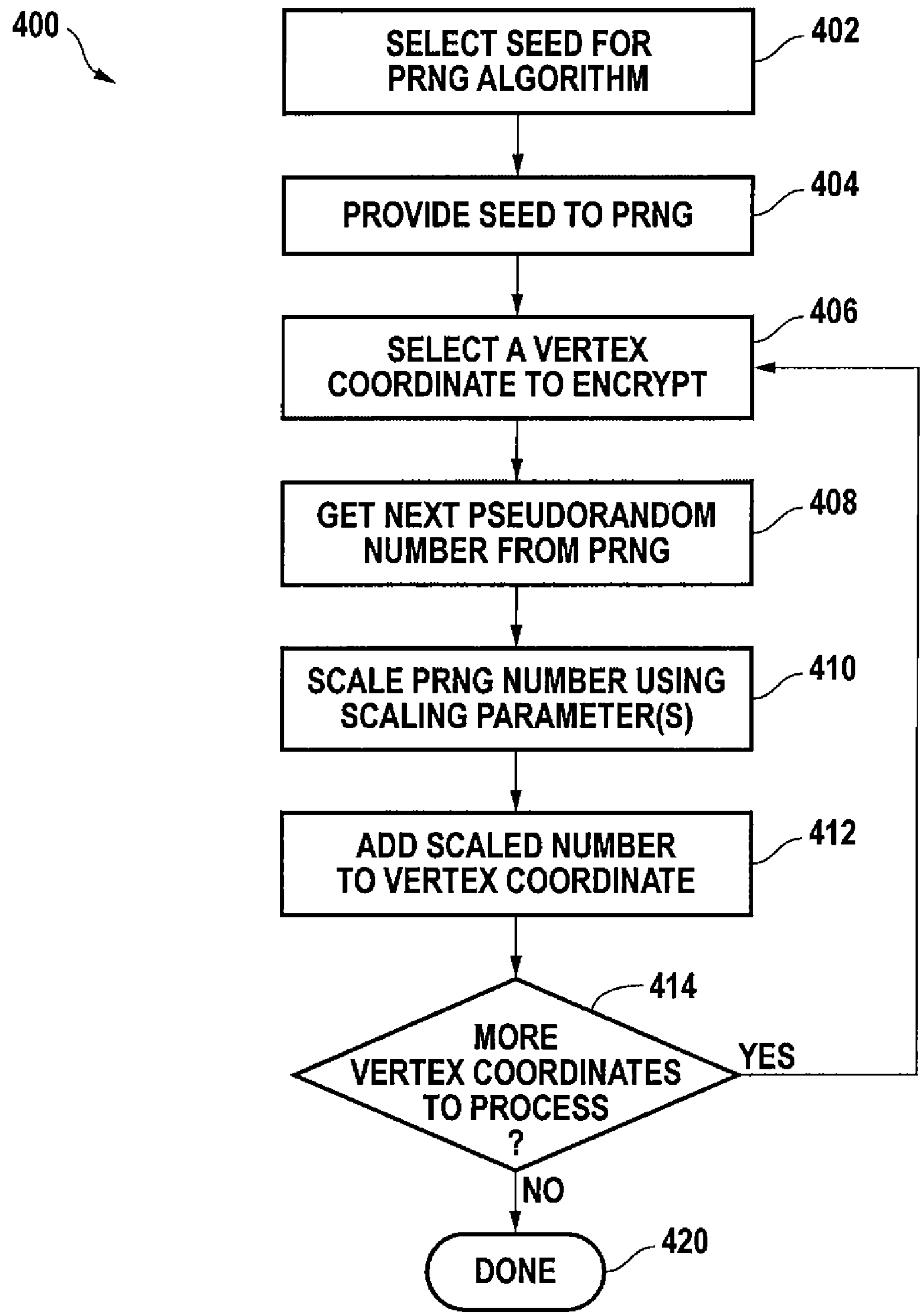
FIG. 4 is a flow chart of a process for encrypting graphics data according to an embodiment of the present invention.

FIG. 4 is a flow chart of a process 400 for encrypting vertex coordinates by perturbation according to an embodiment of the present invention. In general, each vertex has coordinates in three-dimensional space (x, y, z), and each coordinate of each vertex is perturbed independently, based on a sequence of pseudo-random numbers. The pseudo-random numbers are provided by a pseudo-random number generator (PRNG) algorithm, which may be selected from numerous such algorithms known in the art. Such algorithms receive one or more seeds (typically large integers) and produce a sequence of floating-point numbers that has no readily discernible pattern, i.e., the next number cannot readily be predicted from previous numbers. The sequence also generally has a statistically uniform distribution over some interval (e.g., between 0 and 1). Despite the lack of predictability, the sequence is reproducible, meaning that two machines executing the same PRNG algorithm and starting with the same seed(s) can be expected to produce the same sequence of numbers. Thus, a seed value is similar to a conventional encryption key: it is a parameter that is needed by the recipient in order to successfully decrypt the data.

More specifically, at step 402, a seed value for a PRNG algorithm is selected. The seed may be selected in any number of ways, e.g., by reference to the system clock, a number generated from a user's password, and so on. Regardless of how the seed is selected, the recipient needs to have the same seed in order to reproduce the pseudo-random numbers and decrypt the data. In some embodiments, the seed is sent to the recipient as a component of the key. In other embodiments, the recipient is provided with the same data used by the sender to select the seed value, so that the recipient is able to select the same seed. At step 404, the selected seed value is provided to the PRNG.

At step 406, a vertex coordinate to be encrypted is selected. Each coordinate of each vertex is perturbed independently, so that information about one coordinate cannot be used to extract correct values of other coordinates. In one embodiment, the graphics data includes an ordered list of vertices, and each coordinate of each vertex in the ordered list is selected in turn. Other orderings may be used, provided that the recipient is able to reproduce the sender's ordering.

At step 408, the next number in the pseudo-random sequence is obtained from the PRNG. At step 410, the pseudo-random number is scaled using one or more preselected scaling parameters. Scaling parameters enable the sender to control the degree of perturbation (i.e., the degree of distortion to be introduced). For instance, the pseudo-random number generator may provide numbers within a fixed range (e.g., 0 to 1), and that range may or may not provide the desired degree of distortion in a particular instance. To make the encrypted image recognizable (e.g., image 330), a small scaling factor is appropriate; larger scaling factors may be used to create an unrecognizable encrypted image (e.g., image 350). In addition, in some embodiments, it might be desirable to use a distribution of perturbation values that is different from that provided by the PRNG, and the scaling parameters may define a non-linear rescaling function (e.g., a Gaussian distribution with an arbitrarily selected mean and width). Like the seed, the scaling factor is a piece of data that the recipient must have in order to properly decrypt the data and may be provided to the recipient as a component of the key.

At step 412, the scaled pseudo-random number is added to the value of the vertex coordinate, thereby encrypting the vertex coordinate. The encrypted value may be stored temporarily (e.g., in a queue of data to be sent) or permanently (e.g., written to disk), or it may be sent without storing. At step 414, it is determined whether more coordinates remain to be encrypted. In this embodiment, more coordinates remain if not all of the coordinates for the current vertex have been processed or if more vertices remain to be processed. If so, the process returns to step 406 to process the next coordinate. Otherwise, the process exits at step 420.

Figure 5:
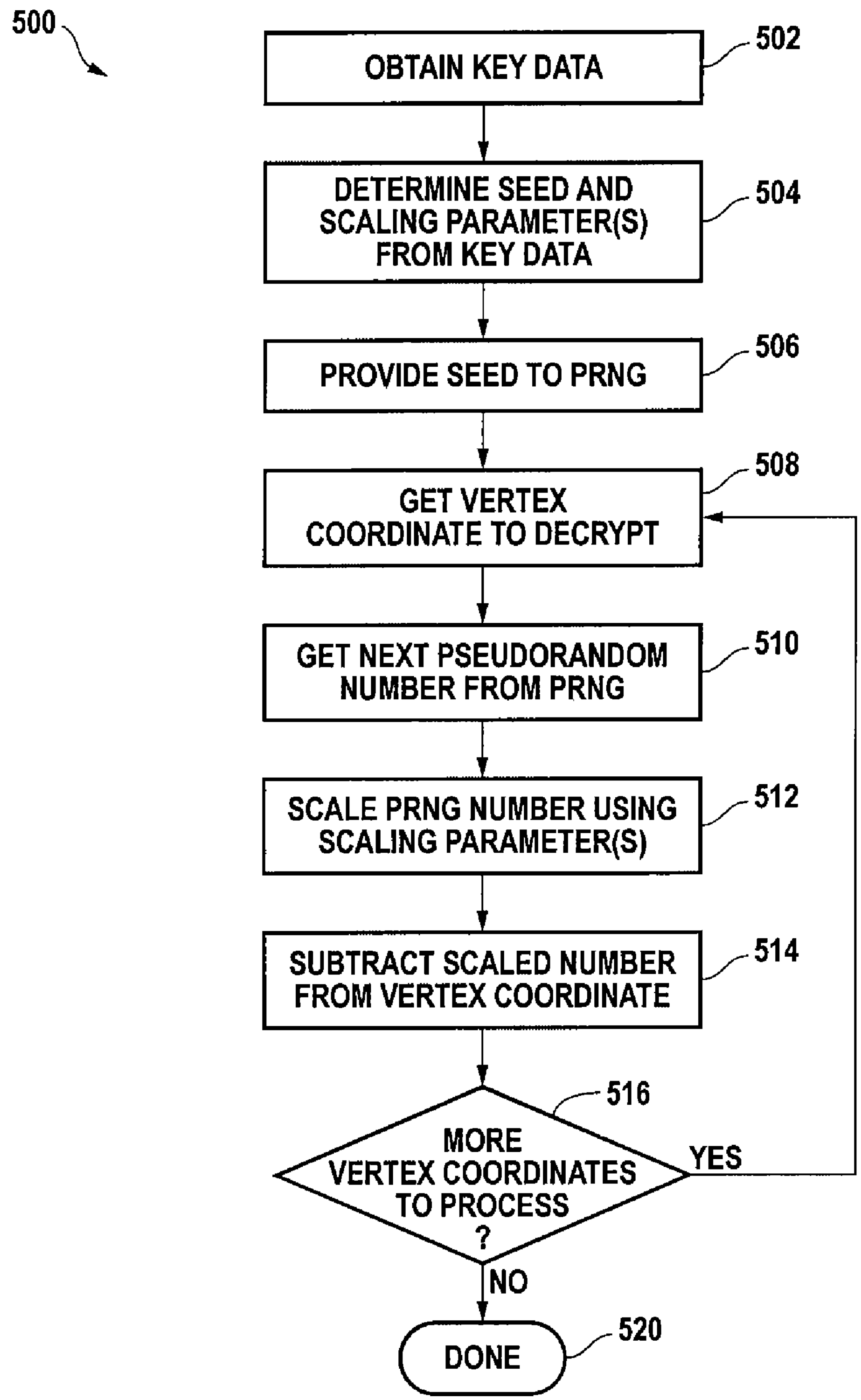
FIG. 5 is a flow chart of a process for decrypting graphics data according to an embodiment of the present invention.

FIG. 5 illustrates a corresponding decryption process 500 that reverses process 400. The recipient is provided with key data that corresponds to the seed for the PRNG algorithm and the scaling factor that were used by the sender. Using the key data, the recipient reproduces the sequence of pseudo-random numbers and removes the perturbations.

More specifically, at step 502, key data is obtained. The key data may contain the seed and scaling parameter values that were used by the sender, or any other data that the recipient can use to determine the seed and scaling parameters. Key data may be provided in various formats using a number of techniques; specific examples will be described below. At step 504, the seed and scaling parameter(s) are determined from the key data.

At step 506, the seed is provided to a pseudo-random number generator operated by the recipient. This pseudo-random number generator uses the same algorithm as the pseudo-random number generator used by the sender in process 400, so that the same seed yields the same sequence of numbers. At step 508, a vertex coordinate to be decrypted is obtained; coordinates are advantageously processed in the same order by the recipient as they were by the sender. At step 510, the next pseudo-random number is obtained from the pseudo-random number generator, and at step 512, the number is scaled using the scaling parameter(s). As long as the vertices are decrypted in the same order in which they were encrypted, the number generated for a particular vertex at step 512 is equal to the number generated for that vertex at step 410 of process 400. At step 514, this number is subtracted from the encrypted vertex coordinate, thereby restoring the original cleartext value.

At step 516, it is determined whether more coordinates remain to be encrypted. In this embodiment, more coordinates remain if not all of the coordinates for the current vertex have been processed or if more vertices remain to be processed. If so, the process returns to step 508 to process the next coordinate. Otherwise, the process exits at step 520.

It should be noted that process 500 is not affected by the size of the perturbation; even a large perturbation can be removed. For instance, upon decryption, the data depicted in image 330 or image 350 would be rendered as image 310.

It will be appreciated that the processes described herein are illustrative and that variations and modifications are possible. Steps described as sequential may be executed in parallel, order of steps may be varied, and steps may be modified or combined. For instance, it is not required that the random numbers be used in sequence; e.g., numbers may be skipped as long as the recipient is given enough information to reproduce the sequence of numbers used. Use of a scaling factor is optional; some PRNG algorithms are designed to provide numbers within a configurable range, so that scaling is part of the random number generation step.

As mentioned above, numerous PRNG algorithms are known in the art and any such algorithm may be implemented. The PRNG algorithm may use one or more seeds. Authorized recipients of the data are given (either in advance or together with the data) the sender's PRNG algorithm, the seed(s) that was (were) used, and the scaling factor. Such recipients can regenerate the sequence of pseudo-random numbers and undo the perturbation (in other words, decrypt the data). Other recipients, ignorant of the PRNG algorithm and/or the seed(s), will not be able to undo the perturbation.

In other embodiments, very simple schemes that alter vertex coordinates are used to provide encryption. For instance, vertex coordinate values expressed in binary formats can be replaced by their ones complement (i.e., each "1" is replaced by a "0" and vice versa), bits can be rotated, and so on. Such a scheme is effective provided that unauthorized recipients do not know what scheme has been used or are not configured to undo the alteration. Thus, as used herein, encryption is intended to encompass any reversible data-alteration algorithm that hides all or part of the true graphics data and is not limited to the particular techniques described herein.

III. Key Data and Key Modules

As noted above, cryptography generally relies on a parameter needed for correct decryption that is provided to the recipient and kept secret from others. Techniques for providing such decryption parameters will now be described.

As used herein, "key data" (or a "key") refers to a decryption parameter supplied to the recipient, as well as other data supplied to the recipient from which the recipient can derive a decryption parameter. Examples of key data include: a password or other data signal that controls whether a pre-programmed decryption algorithm is executed or not (the decryption parameter in this instance is a binary switch); data identifying which of a number of pre-programmed decryption algorithms to execute; and decryption parameter values for a pre-programmed decryption algorithm (e.g., a key for a conventional symmetric or asymmetric algorithms, or seeds and scaling factors for perturbation algorithms). In some embodiments, key data may also include executable instructions implementing all or part of a decryption algorithm.

As described above, in embodiments of the present invention, a recipient device includes a key module that receives key data and supplies decryption parameters to a decryption module. Key modules may be implemented to receive any of the key data described above and to perform any necessary computations to derive the decryption parameters from the received key data. In either case, key modules may be implemented such that key data is received from the sender or from a different device.

In embodiments where the key module receives the key data from the sender, the key module generally includes a register or other data storage device (e.g., an addressable memory array) for storing the received key data and/or the decryption parameters derived from the received key data. The key module may also store additional data for determining correctness of the received key data. For instance, in the embodiment of FIG. 1, a user of system 100 may enter a password that is transmitted to graphics processing system 112 and compared to a correct password stored in key module 126 (which, in this instance, includes a nonvolatile storage device that holds the correct password). The decryption parameter in this example may be binary valued, signaling the decryption module that a correct password was or was not received; in the latter case, the decryption module does not decrypt the data.

Key data that provides parameters needed for correct execution of the algorithm (e.g., random-number seeds or keys for conventional encryption algorithms) may also be implemented by various forms of data exchange between the sender and recipient, with the key data and/or a decryption parameter derived therefrom being stored by the key module. Key data transmitted by the sender is not itself encrypted, but the transmission may be disguised in various ways so that an intercepting party does not recognize that key data is being transmitted. For instance, the key data may be sent out-of-band, e.g., during system startup, and stored by the recipient in key module 126 until it is needed. The key data may also be sent by the graphics driver at any time during operation via an innocuous function call or sequence of several calls to graphics processing system 1112 that, when taken together, can be used by key module 126 to determine the decryption parameter.

In yet another embodiment, a sender and a recipient may each generate the same decryption parameter (e.g., a perturbation parameter such as a scaling factor or seed, or a conventional cryptographic key) by performing computations on key data known to both. For example, a decryption parameter may be computed from stored data related to transaction history between the sender and recipient, device-specific information (e.g., serial number) of either device or both devices, and the like. If the data is not known to both parties, data other than the message data or the parameter values may be exchanged as needed, and the term "key data" includes any such data. Computation of decryption parameters from other shared data may be implemented using techniques similar to the Secure Socket Layer (SSL) protocol, which is known in the art and widely used for transmitting encrypted data between World Wide Web servers and clients.

Figure 6:
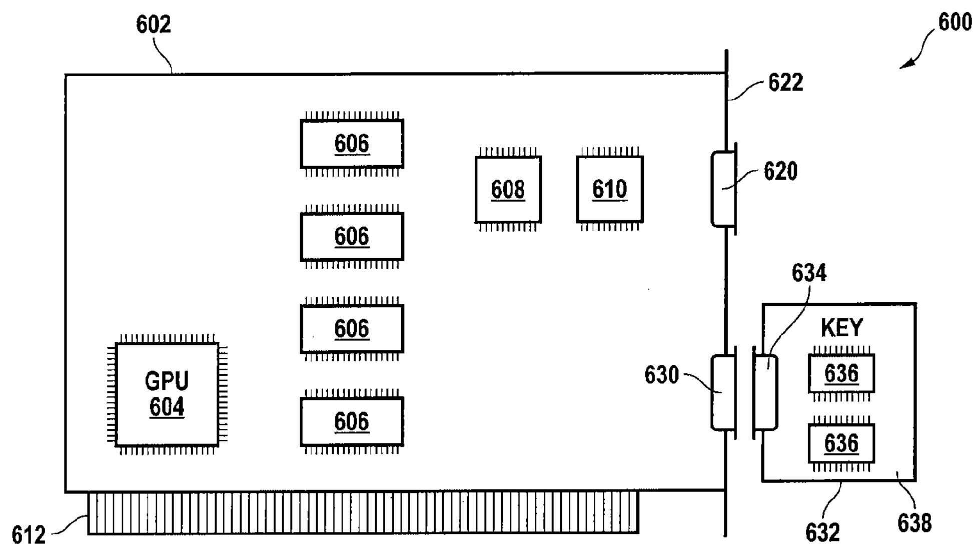
FIG. 6 is a plan view of a graphics card with a hardware-based key according to an embodiment of the present invention.

As mentioned above, a key module is not restricted to obtaining key data from the sender; a different "key device" may be used to provide all or part of the key data. FIG. 6 is a simplified view of a graphics card 600 that interacts with a key device 632 according to an embodiment of the present invention. In some embodiments, graphics card 600 implements graphics processing system 112 of FIG. 1 and is mountable on a conventional motherboard for connections to system bus 106.

Graphics card 600 includes a printed circuit board 602 having various components mounted thereon. These components generally include one or more integrated circuits (chips), such as a graphics processor 604, one or more memory devices 606, a scanout circuit 608, and a digital-to-analog converter (DAC) 610. These components may be implemented using conventional integrated circuit techniques. Printed circuit board 602, which may be fabricated using conventional techniques, provides conductive pathways connecting the various components. Printed circuit board 602 includes an interface tab 612 that can be inserted into an appropriate connector mounted on the motherboard, thereby providing power and data connections between graphics card 600 and other components of a computer system.

Also mounted on printed circuit board 602 is a receptacle 620 for a display device cable (not shown), thereby enabling graphics card 600 to provide pixel data to a display device. Receptacle 620, which may be of conventional design, is advantageously disposed along an edge 622 of graphics card 600 that is accessible from outside the computer housing when graphics card 600 is mounted on the motherboard so that a user may connect a cable from a display device to receptacle 620 without opening the housing.

Graphics card 600 also includes a receptacle 630 adapted to receive key device 632, which has a corresponding plug 634. Receptacle 630 is advantageously disposed along edge 622 of graphics card 600 so that key device 632 may be inserted into and removed from receptacle 630 without opening the housing of the computer.

Receptacle 630 and plug 634 are designed to establish at least one electrical signal pathway between key device 632 and graphics processor 604; various conventional electrical connectors may be used, with serial or parallel couplings. When inserted into receptacle 630, key device 632 transmits information to graphics processor 604 for use in decryption of graphics data. In one embodiment, the information simply indicates the presence of key device 632 in receptacle 630, causing graphics processor 604 to enable a pre-programmed decryption algorithm. Such an embodiment relies on secrecy of the encryption and/or decryption algorithms and the difficulty of manufacturing a device that matches the electrical and mechanical configuration of receptacle 630; in general, such keys do not provide a maximum degree of security.

In other embodiments, the signal provides more complex data. In one such embodiment, key device 632 may transmit a serial number that is compared to a corresponding piece of data resident on graphics card 600, e.g., in nonvolatile memory, or to a corresponding piece of data (e.g., an authorization code) received from the sender. If the signal from the key device matches the corresponding piece of data, the decryption algorithm is enabled; otherwise, it is disabled and incoming data is displayed without decryption. In another embodiment, key device 632 provides decryption parameters or other key data that can be used by graphics processor 604 to compute decryption parameters. For instance, if the encryption algorithm uses perturbation as described above, key device 632 may provide a value for the PRNG seed(s) used by the sender or with another number that may be used by graphics processor 604 to derive the seed. Key device 632 may also provide executable instructions for all or part of a decryption algorithm to be executed by graphics processor 604.

To provide such data, key device 632 advantageously includes a non-volatile memory such as a programmable read-only memory (PROM) 636 mounted on a circuit board 638 that provides signal pathways between PROM 636 and plug 634, enabling data stored in PROM 636 to be provided to graphics processor 604 via connections between plug 634 and key receptacle 630. Thus, graphics processor 604 may obtain key data by reading data stored in PROM 636. PROM 636 may store a large number of bits, making the range of possible key data large, so that the correct key data is difficult to guess. In some embodiments, PROM 636 is erasable and rewritable (e.g., an electrically erasable PROM, or EEPROM). Electrical components of key device 632 are advantageously enclosed in a housing (not shown) to protect key device 632 against damage.

In another embodiment, receptacle 630 provides a number of pins and key device 632 includes one or more jumpers (not shown) that electrically connect certain ones of the pins when key device 632 is inserted into receptacle 630. A correct set of pin connections enables the decryption algorithm of graphics processor 604.

It will be appreciated that the key module implementations described herein are illustrative and that variations and modifications are possible. For instance, where a key device is provided, the key receptacle need not be located on a graphics card; it may be located on another system component and communicate with a graphics card via a bus. In addition, a key receptacle may be included in a device that does not have a dedicated graphics card, e.g., devices having a graphics co-processor mounted on a motherboard or devices that use the primary system processor to perform rendering functions. As long as compatible configurations are provided for the key receptacles, key devices may be made interchangeable between different graphics cards or different devices having different configurations, such as a desktop personal computer system and a handheld device. In some embodiments, a physical connection between the key device and the recipient device is not required; for instance, a wireless (e.g., infrared or radio frequency) interface between a graphics card and a key device may be implemented. Wireless connections are advantageously provided using short-range technologies so that the key device is effective only when in close proximity to the recipient device.

In still other embodiments, key modules receive key data from the sender and one or more key devices. For instance, insertion of a specific key device into a key receptacle of the recipient device may be required to enable a decryption algorithm, while parameters for correct execution of the algorithm are received from the sender. In other embodiments, decryption parameters (or data needed to compute the parameters) may be provided by any combination of the sender and another device (or devices).

IV. Sharing of Graphics Data

In the embodiment of FIG. 1, the sender and recipient are components of a single computer system in which graphics data is transmitted on a bus connecting the components. In other embodiments, the sender and recipient may be different devices (e.g., different computer systems) or components of different devices, and a sender may share graphics data with any number of recipients. In such embodiments, multiple users may be given access to the graphics data. A user may be given full access to the graphics data, or partial access, in which the data is distorted to some degree and/or portions of the data are omitted. Examples of these embodiments will now be described.

A. Distributed System Embodiment

Figure 7:
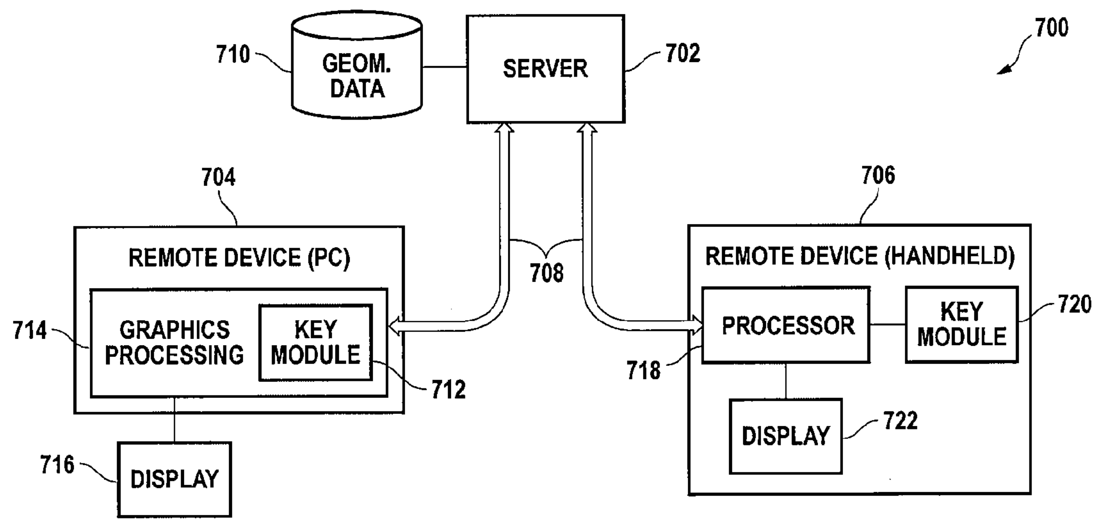
FIG. 7 is a simplified block diagram of a graphics data sharing system according to an embodiment of the present invention.

FIG. 7 is a high-level block diagram of a graphics data processing system 700 according to another embodiment of the invention. System 700 includes a server 702 and one or more remote devices, such as a personal computer 704 and a handheld device 706. Server 702 acts as a source of graphics data to be rendered by remote devices 704, 706. The graphics data may be generated by a program executing on server 702 and transmitted contemporaneously with its generation, or it may be generated in advance (either by server 702 or by another device) and stored in a data store 710 accessible to server 702.

Server 702 provides the graphics data to remote devices 704, 706 via communication paths 708, which may be implemented in various ways, including local area networks, wide area networks, Internet, wireless communication links, and so on. In general, communication paths 708 are not secure; data transmitted via paths 708 can be intercepted by unauthorized third parties using various well known technologies. To reduce the likelihood of sensitive graphics data falling into unauthorized hands, server 702 transmits the data in encrypted form, so that any unauthorized users who intercept the data will be unable to view it. The encryption may be performed using any of the techniques described above.

Server 702 may obtain encrypted data to transmit in various ways. In one embodiment, server 702 stores the data in encrypted form in data store 710 and responds to requests for the data by sending the stored encrypted data. In another embodiment, data is stored in unencrypted form in data store 710, and server 702 performs the encryption algorithm prior to sending requested data. In yet another embodiment, data is stored in data store 710 using a first encryption technique; server 702 decrypts the data, re-encrypts it using the techniques described above, and sends the re-encrypted data to remote devices 704, 706.

Remote devices 704, 706 receive encrypted graphics data, decrypt it, and render it for display. More specifically, remote device 704 is a personal computer equipped with a graphics processing subsystem 714 and may be configured similarly to system 100 of FIG. 1. In this instance, however, the CPU does not generate or encrypt the graphics data; instead, the encrypted data is provided by server 702 and flows to graphics processing system 714. Graphics processing subsystem 714 has a key module 712 that controls whether the received data is decrypted. Like key module 126, key module 712 may include a receptacle for a key device and/or a register that stores key data (or a decryption parameter derived therefrom). Based on the presence or absence of the key data in key module 712, as well as on the content of the key data, graphics processing subsystem 714 decrypts the graphics data for further processing.

Remote device 706 is a compact handheld device (such as a personal digital assistant) that has graphics processing capabilities. Unlike device 704, device 706 does not have a separate graphics processing subsystem. Instead, graphics functions are performed by the main processor 718. Remote device 706 is provided with a key module 720 that communicates with main processor 718. Like key module 712, key module 720 may include a receptacle for a key device and/or a register that stores key data (or a decryption parameter derived therefrom). Based on the presence or absence of the key data in key module 720, as well as on the content of the key data, main processor 718 decrypts the graphics data for further processing.

In some embodiments, despite the difference in form factors between remote devices 704 and 706, key modules 712 and 720 have receptacles configured to receive key devices of the same physical configuration. In such embodiments, a user who has a key device may use the same key device with either of remote devices 704 and 706 to decrypt and view the data. Any differences between the image as displayed on different remote devices is the result of differences in the internal graphics processing capabilities of the devices, such as color resolution, number of pixels, rasterization techniques, and so on.

It will be appreciated that the system described herein is illustrative and that variations and modifications are possible. A variety of configurations of remote devices may be provided, with or without a dedicated graphics processing subsystem or graphics processor, and any number and combination of different remote devices may be provided. Key modules may be implemented using any of the techniques described above and may be implemented differently for different devices. The server may be implemented as any computing device capable of transmitting encrypted graphics data, and transmissions may be made in response to requests from particular remote devices or other instructions given to the server (e.g., periodic updates pushed to remote devices). The transmission protocol may include user authentication components; e.g., the server and/or remote device may be configured such that data is not transmitted to the remote device unless a valid user has logged in to the remote device.

B. Security Clearance Levels

In some embodiments, graphics data is viewable on a particular recipient device at different degrees of fidelity, depending on a "security clearance" level associated with a given recipient device or user. In this embodiment, the key data includes a user-dependent clearance level for the recipient device to use, and the operation of the decryption algorithm varies depending on the clearance level. For example, in system 700 of FIG. 7, there may be a "high level" key that enables a user to view an image generated from decrypted data that exactly matches the cleartext (e.g., image 310 of FIG. 3) and a "low level" key that enables the user to view an image only with reduced fidelity (e.g., image 330 of FIG. 3).

Figure 8:
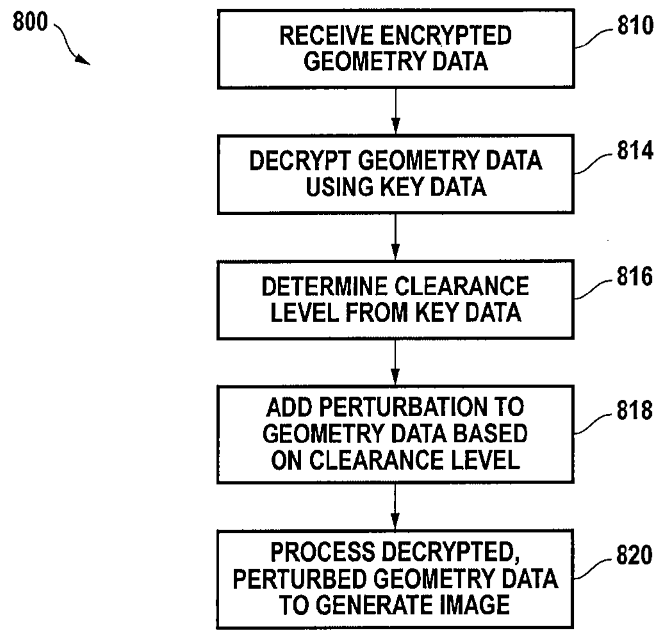
FIG. 8 is a flow chart of a decryption process according to another embodiment of the present invention.

FIG. 8 illustrates a decryption process 800 for an authorized recipient according to an embodiment of the present invention that provides data at different levels of fidelity. Process 800 involves decrypting the data, then adding a perturbation based on a clearance level included in the key data.

More specifically, at step 810, the recipient (e.g., graphics processing subsystem 714 of remote device 704 or main processor 718 of remote device 706) receives encrypted graphics data. At step 814 the recipient decrypts the data, restoring the original data. Implementation of step 814 depends on the encryption algorithm used by the sender, which may include any of the techniques described above. For instance, if the encryption used perturbations, step 814 includes removing these perturbations. Step 814 generally includes accessing key data, as described above.

After decryption and before subsequent processing, the recipient determines the clearance level from the key data at step 816. Examples of how a clearance level may be included in key data will be described below. Based on this clearance level, the processor adds a perturbation to the data at step 818. The perturbation may be done according to the techniques described above with reference to FIG. 4. In this case, however, it is not required that the perturbation be reversible. Accordingly, stochastically generated random numbers or pseudo-random numbers having a sequence that is difficult or impossible to reproduce may be used. It should be noted that if the sender used perturbations to encrypt the data, the perturbation added at step 818 need not have any correlation with the perturbation that was removed at step 814.

The degree to which the data is perturbed at step 818 may be determined in different ways. In one embodiment, perturbation is limited to some fraction of the bounding box size or other size parameter of the image, with the fraction depending on the clearance level. For instance, at a low clearance level, the fraction may be 30% of the bounding box, which produces severe distortion in many types of images; at a higher clearance level, the fraction may be 2%, producing a small distortion. For a "full access" clearance level, the fraction may be 0%, meaning that the data is not perturbed at all.

In another embodiment, the amount of perturbation to be applied for different clearance levels may be determined empirically for a particular image. In this embodiment, the creator of an image is able to apply different perturbation parameters and view the resulting images, thereby selecting parameters for each clearance level that provide a desired amount of distortion. A table or other data structure specifying the selected perturbation parameters for each clearance level can then be transmitted with the graphics data to the recipient. At step 818, the recipient reads the table to retrieve the perturbation parameters associated with the clearance level of the particular key data it has been given, then applies the appropriate perturbation.

In some embodiments, the degree of perturbation may be controlled on a per-primitive or per-object basis. For instance, one may want parts of the graphics data that contain trade secrets (e.g., an aileron in a geometric model of an airplane) to be distorted without distorting other parts (e.g., a logo of the airplane manufacturer on the side of the fuselage). Each primitive (or group of primitives) may include one or more parameters indicating a degree of perturbation to be applied at each clearance level.

At step 820, the recipient proceeds with processing of the graphics data using the decrypted and perturbed data. The image is displayed correctly if the key data corresponds to a "full access" clearance level; otherwise, the image is incorrect to some degree due to the perturbation.

It will be appreciated that the process described herein is illustrative and that variations and modifications are possible. Steps described as sequential may be executed in parallel, order of steps may be varied, and steps may be modified or combined. In some embodiments where the received data was encrypted using perturbations, the perturbations are partially removed, with the residual perturbation depending on the clearance level in the key data.

In another embodiment, clearance levels may also be used to determine which primitives are rendered at all. This can be implemented using a per-primitive (or per-object) visibility parameter having a value indicating a clearance level required to view the primitive. For clearance levels below this minimum, the primitive is simply deleted from the list of primitives to be rendered. Visibility parameters can be used to make a particular feature of an image invisible in the event that the key data does not correspond to an adequate clearance level. It should be noted that visibility and other perturbation parameters may be ignored by recipients that have no key, but such recipients will be unable to decrypt the data to obtain useful information.

Clearance levels and their effects are advantageously definable by the creator of the graphics data. The creator may define any number of clearance levels and specify how much perturbation is to be applied for each clearance level on a global, per-primitive, or per-object basis. In general, there may be any number of levels, and the defined levels may include a "full clearance" level that provides complete, unperturbed graphics data. Unauthorized users may be said to be at a "no-clearance" or "zero" level, at which only the encrypted data is available.

Each authorized user is assigned a clearance level, and information about a user's clearance level is included in the key data. This may be done in a number of ways. For instance, in one embodiment, a key device (e.g., key device 632 of FIG. 6) is given to each authorized user. The key device may store a code representing that user's clearance level, with the code being recognizable to the recipient. In other embodiments, user authentication mechanisms (e.g., user names and/or passwords) may be used to identify a user and look up the clearance level associated with that user. Associations between users and clearance levels may be maintained by either the sender or recipient.

C. Example: Re-Purposing CAD Data

In some embodiments, the ability to provide multi-level security enables re-purposing of graphics data. For example, graphics data describing a planned or existing product may be generated using a computer-aided design (CAD) application program and shared among different users who have different requirements. For instance, a designer working on an improvement to the product needs the most exact model possible. A technical writer preparing user documentation for the product generally does not need an exact model. An advertising designer needs even less exact data.

Figure 9:
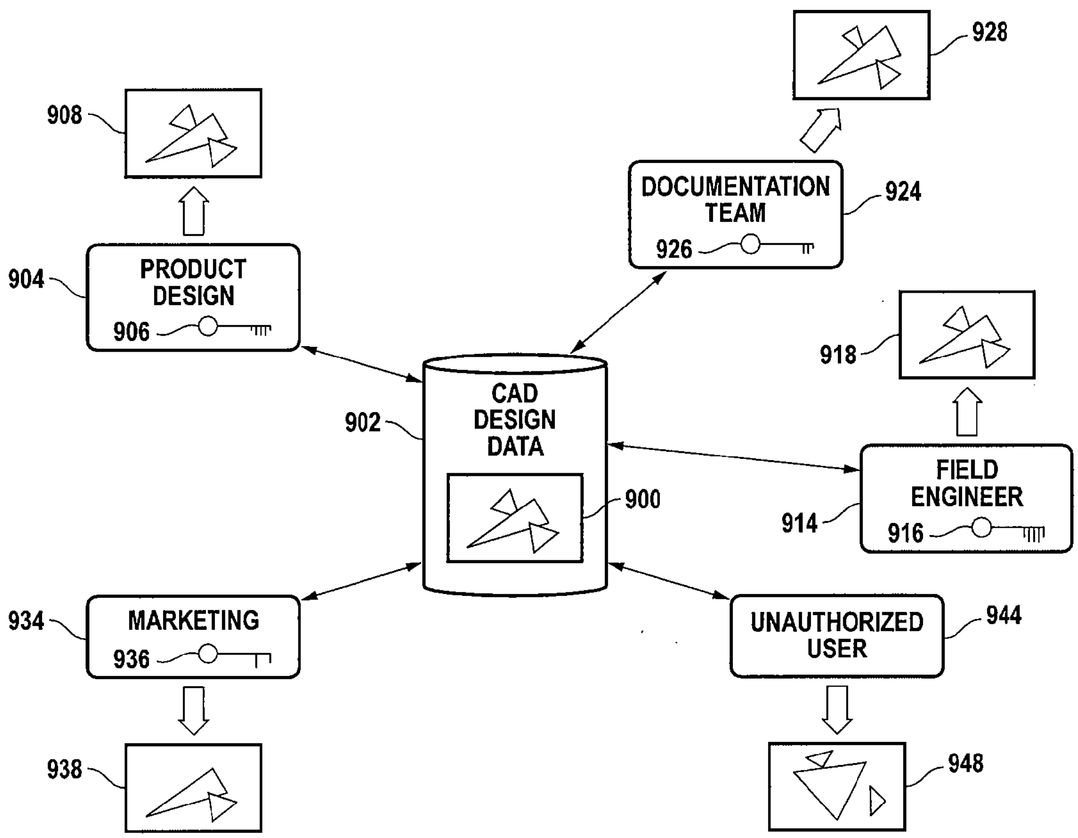
FIG. 9 is an illustration of sharing graphics data according to an embodiment of the present invention.

FIG. 9 illustrates re-purposing of data according to an embodiment of the present invention. Cleartext graphics data 900 is generated using a CAD application and stored on a server 902 in cleartext or encrypted form. Server 902 provides the graphics data in an encrypted form to various recipient devices operated by users who hold different keys.

For instance, a product designer 904 holds a "full access" key 906. When the full access key 906 is used to decrypt the data, the cleartext data is correctly reproduced, as indicated by image 908. Likewise, a field engineer 914 also holds a full access key 916 and is able to view correct images, as indicated by image 918. Documentation team member 924 holds a "mid-level" key 926 and views somewhat distorted data, as indicated by image 928. Marketing team member 934 holds a "low-level" key 936 and views distorted data in which some of the data is not displayed at all, as indicated by image 938. An unauthorized user 944 is also shown. Unauthorized user 944 has no key, and the encrypted graphics data results in a severely distorted image 948.

It is to be understood that FIG. 9 is illustrative, and that other uses and configurations are possible. There may be any number of users and any number of clearance levels, not limited to the three levels shown.

V. FURTHER EMBODIMENTS

As described above, embodiments of the present invention provide enhanced security for graphics data that is transferred between devices by enabling encryption and decryption within a graphics processing pipeline. Decryption advantageously occurs within the same component that rasterizes the data, so that the unencrypted data is not readily accessible to any other component. Portions of the data (e.g., vertex coordinates) may be selected for encryption, thereby making the encrypted data unusable or uninformative without the computational burden associated with encrypting and decrypting all of the data.

This enhanced security has numerous applications. For instance, a video game designer may develop a particularly efficient primitive-based representation that produces a realistic depiction of some object (e.g., a character or vehicle). To prevent competitors from intercepting the primitives that are sent between a processor executing the game program and a graphics processor that renders images for the game, the primitives may be sent in an encrypted form so that even if the data is intercepted, it will not provide any useful information.

In addition, as described above, some embodiments subject decrypted data to a perturbation that depends on a clearance level associated with a particular user. This allows partial geometry information to be shared, rather than requiring an "all or nothing" model of data sharing. The same geometry model can be reused for different purposes without compromising secret information, thereby reducing the need to create different models of the same object.

While the invention has been described with respect to specific embodiments, one skilled in the art will recognize that numerous modifications are possible. For instance, graphics data other than geometry may be encrypted, including pixel data, any texture data that is not part of the geometry, and so on. Different portions of the data may be encrypted using different techniques, provided that an intended recipient is able to determine which techniques were used for which portions. Encryption and decryption algorithms may be implemented in hardware components, software instructions to be executed by suitable processors, or any combination thereof.

Thus, although the invention has been described with respect to specific embodiments, it will be appreciated that the invention is intended to cover all modifications and equivalents within the scope of the following claims.

What is claimed is:

1. A device for processing an image, the device comprising:

a decryption module configured to receive graphics data, wherein at least a portion of the received graphics data is encrypted, and to decrypt the graphics data based at least in part on a decryption parameter;

a key module configured to receive key data and to provide the decryption parameter to the decryption module in response to the key data; and an image generation module coupled to receive the decrypted graphics data from the decryption module and configured to transform the decrypted graphics data to displayable image data.

2. The device of claim 1 wherein the decryption module is further configured to provide the encrypted graphics data to the image generation module in the event that the key module does not provide the decryption parameter.

3. The device of claim 1 wherein the encrypted portion of the graphics data is encrypted by applying a perturbation, the perturbation being removable by the decryption module.

4. The device of claim 1 wherein the key data includes the decryption parameter.

5. The device of claim 1 wherein the key module is further configured to compute the decryption parameter using the key data.

6. The device of claim 1 wherein the key module includes a receptacle for a key device and wherein the key module is further configured to obtain the key data from the key device.

7. The device of claim 6 wherein the decryption parameter corresponds to the presence or absence of the key device in the receptacle.

8. The device of claim 6 wherein the key device is configured to store the key data and the key module is configured to read the key data when the key device is present in the receptacle.

9. The device of claim 1 wherein the key module receives the key data from a sender and the decryption module receives the graphics data from the same sender.

10. The device of claim 1 wherein the key module is further configured to receive either of first key data and second key data and to provide a first decryption parameter in response to the first key data and a second decryption parameter in response to the second key data, wherein in response to the first decryption parameter, the decryption module completely decrypts the graphics data and, in response to the second decryption parameter, the decryption module decrypts the graphics data with a residual distortion.

11. A system for generating images, the system comprising:

a sender device configured to send graphics data via a communication channel, wherein at least a portion of the graphics data is encrypted;

a recipient device including:

a decryption module configured to receive the encrypted graphics data and to decrypt the graphics data based at least in part on a decryption parameter;

a key module configured to receive key data and to provide the decryption parameter to the decryption module in response to the key data; and an image generation module coupled to receive the decrypted graphics data from the decryption module and configured to transform the graphics data to displayable image data.

12. The system of claim 11 wherein the sender device and the recipient device communicate via a bus.

13. The system of claim 12 wherein the sender device is a central processing unit and the recipient device includes a graphics processing unit.

14. The system of claim 11 wherein the sender device and the recipient device communicate via a network.

15. The system of claim 11 wherein the key module includes a receptacle for a key device, the key device providing the key data to the key module.

16. The system of claim 11 wherein the key data includes the decryption parameter.

17. The system of claim 11 wherein the key module is further configured to compute the decryption parameter using the received key data.

18. The system of claim 11 wherein the key module is configured to receive either of first key data and second key data and further configured to provide a first decryption parameter in response to the first key data and a second decryption parameter in response to the second key data,
  wherein in response to the first decryption parameter, the decryption module completely decrypts the graphics data and, in response to the second decryption parameter, the decryption module decrypts the graphics data with a residual distortion.

19. A method of generating an image, the method comprising:
  receiving graphics data for the image, wherein at least a portion of the received graphics data is encrypted;
  determining whether a key is present; and
  in response to determining that the key is present:
    decrypting the encrypted portion of the graphics data; and
    rendering an image using the decrypted graphics data.

20. The method of claim 19, further comprising:
  in response to determining that the key is not present, rendering an image using the received graphics data including the encrypted portion.

21. The method of claim 19 further comprising:
  in response to determining that the key is present, extracting a decryption parameter from the key,
  wherein the act of decrypting the encrypted portion of the graphics data is responsive to the decryption parameter.

22. The method of claim 19, further comprising, prior to the act of receiving the graphics data:
  encrypting at least a portion of the graphics data; and
  transmitting the graphics data.

23. The method of claim 22 wherein the act of transmitting the graphics data is performed using a system bus.

24. The method of claim 23 wherein the act of encrypting is performed by a central processing unit executing a graphics driver program.

25. The method of claim 22 wherein the act of transmitting the graphics data is performed using a network.

26. The method of claim 19 wherein the act of determining whether the key is present includes detecting a presence or absence of a key device.

27. The method of claim 19 wherein the act of determining whether the key is present includes detecting a presence or absence of key data.

28. The method of claim 19 wherein the act of decrypting the graphics data includes:
  restoring the graphics data to its unencrypted state; and
  perturbing a parameter value of the restored graphics data based on a perturbation parameter.

29. The method of claim 28 wherein the parameter value is a vertex coordinate of a primitive.

30. The method of claim 28 wherein the perturbation parameter is determined from the key.

31. The method of claim 30 wherein the perturbation parameter corresponds to a clearance level associated with the key.

32. A method for sharing encrypted graphics data among a plurality of users, the method comprising:
  associating each of the plurality of users with a respective one of a plurality of keys for decrypting the encrypted graphics data;
  receiving the encrypted graphics data at a recipient device;
  receiving one of the plurality of keys at the recipient device, wherein the one of the plurality of keys is provided by the associated user; and
  decrypting the encrypted graphics data based at least in part on the received key.

33. The method of claim 32 wherein each key includes an identifier of a clearance level and the act of decrypting the graphics data depends at least in part on the clearance level.

34. The method of claim 33 wherein during the act of decrypting, a perturbation is applied to the graphics data, the size of the perturbation being dependent on the clearance level.

35. The method of claim 33 wherein during the act of decrypting, the clearance level is used to determine whether to discard a portion of the graphics data.

36. The method of claim 32 wherein the act of associating each of the plurality of users with a respective one of the plurality of keys includes providing a respective hardware device for each user, each hardware device storing key data, and wherein the act of receiving one of the plurality of keys includes communicating with the hardware device.

37. The method of claim 36 wherein communicating with the hardware device includes receiving the hardware device in a receptacle of the recipient device.

38. The method of claim 32 wherein the act of associating each of the plurality of users with a respective one of the plurality of keys includes providing a password for each user, and wherein the act of receiving one of the plurality of keys includes receiving the password.

* * * * *